United States Patent
Montemont et al.

(10) Patent No.: US 7,345,285 B2
(45) Date of Patent: Mar. 18, 2008

(54) SPECTRA ACQUISITION SYSTEM WITH THRESHOLD ADAPTATION INTEGRATOR

(75) Inventors: Guillaume Montemont, Grenoble (FR); Patrice Ouvrier-Buffet, Entredozon (FR); Loick Verger, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 93 days.

(21) Appl. No.: 11/093,898

(22) Filed: Mar. 29, 2005

(65) Prior Publication Data

US 2005/0230632 A1 Oct. 20, 2005

(30) Foreign Application Priority Data

Mar. 31, 2004 (FR) .................................. 04 50627

(51) Int. Cl.
*G01T 1/24* (2006.01)
(52) U.S. Cl. ..................................... 250/371
(58) Field of Classification Search ............... 250/371, 250/370.13
See application file for complete search history.

(56) References Cited

U.S. PATENT DOCUMENTS

| | | | |
|---|---|---|---|
| 4,543,530 A | 9/1985 | Kovach | ..................... 328/108 |
| 5,821,538 A | 10/1998 | De Antoni et al. | |
| 5,854,489 A | 12/1998 | Verger et al. | |
| 6,211,664 B1 | 4/2001 | Bonnefoy et al. | |
| 2003/0226973 A1* | 12/2003 | Beusch | .................. 250/370.09 |

FOREIGN PATENT DOCUMENTS

FR 2 738 919 A1 9/1995

OTHER PUBLICATIONS

European Search Report related to EP 05102496; mailed Jan. 3, 2006; 5 pgs. not a publication.

* cited by examiner

*Primary Examiner*—Constantine Hannaher
(74) *Attorney, Agent, or Firm*—Thelen Reid Brown Raysman & Steiner LLP

(57) ABSTRACT

A method for exploiting a signal provided by a detector is disclosed. For one embodiment, the time spent by at least one part of the signal above a value S0 of a first threshold is determined. The charge corresponding to the part of the signal during the time spent above the value S0 of the first threshold is determined. A new value S'0 of the first threshold as a function of the charge and the time spent above the value S0 of the first threshold is determined. The steps of determining the time spent by at least one part of the signal above a value S0 of a first threshold and determining the charge corresponding to the part of the signal during the time spent above the value S0 of the first threshold are reiterated at least once using the new value of the first threshold.

44 Claims, 6 Drawing Sheets

SPECTRA ACQUISITION SYSTEM WITH THRESHOLD ADAPTATION INTEGRATOR

CROSS-REFERENCE TO RELATED APPLICATION

This application claims priority to French Application No. 04 50627, filed on Mar. 31, 2004, entitled: "Spectra Acquisition System with Threshold Adaptation" by Guillaume MONTEMONT, Patrice OUVRIE-BUFFET, and Loick VERGER and was not published in English.

TECHNICAL FIELD AND STATE OF THE PRIOR ART

The invention concerns the field of spectrometry, particularly X or gamma, by means of a semi-conductor detector.

Such detectors often have charge carrier collection problems.

An incident radiation spectrometry makes it possible to determine the quantity of charge carriers created by the interaction of a photon, for example X or gamma.

To this end, one applies an electric field to the detector material by means of electrodes in such a way as to drain these charges and induce an electric signal the amplitude of which is proportional to their quantity. Unfortunately, the measurement of this quantity of carriers is made difficult by the imperfect transport properties of the semi-conductor: indeed, part of the charges does not reach the electrodes. This is the problem of incomplete collection.

Furthermore, particularly in the case of CdZnTe, transport properties of the holes are particularly poor whereas those of the electrons are good.

One then measures a signal that corresponds to the transit of the electrons in the material.

One of the methods proposed to correct this incomplete collection, which is due to poor transport of the holes, is to carry out an electronic processing of the measured signal.

In addition to the amplitude measurement measuring the total collected charge, one or several other parameters of the form of the obtained electric signal are measured (for example, its rise time). This makes it in particular possible to go back to the site of interaction of the photon in the semi-conductor medium.

Thanks to a calibration of the collection efficiency as a function of the interaction site, one may then determine the charge actually deposited by the photon.

This method is the bi-parametric "electrons" method disclosed in document FR-2738919.

The rise time may be determined in different ways.

A first method consists in measuring the time spent between the charge signal going through a triggering threshold (performed by a comparator) determining the start of the pulse and its arrival at its maximum amplitude (measured by a peak detector).

Another method consists in working on the current signal (obtained by means of a differentiator circuit). One then measures the time spent between the current passing above a threshold value and its return below said threshold. This method has the advantage of being precise and easy to carry out since it uses a comparator and a time to amplitude converter.

However, said methods have limitations, particularly with regard to the linearity of the measurements on an important signal dynamic. Moreover, one can configure them so as to minimise the noise uniquely around certain signal values.

FIG. 1, which shows two current pulses, gives an explanation of the problem in the case of the second above-mentioned method.

In this figure, Te is the transit time of the electrons for a given interaction site: T2 is the time measured for a high energy and T1 is the time measured in the case of a weaker energy pulse.

Due to the time constants of the system (imposed by the necessity to filter the noise), one has T1<T2<Te.

One therefore obtains measured times which are different to each other and different to the transit time of the electrons, which is normally unique.

Moreover, in terms of noise, there will be an optimum threshold position (in general, at the point where the slope is at a maximum). However, this position can only be met for a certain amplitude value.

Indeed, there is a compromise to be made between dynamic and noise: filtering limits noise but reduces stability of performances over a large dynamic.

A second limitation of conventional methods is the impossibility of processing complex pulses, due for example to multiple interactions.

A double interaction ID is represented in FIG. 2, the curve IS representing a simple interaction. In such a case, the bi-parametric method is put at fault.

Two incident photons of different energies give the measured amplitude/time pairing.

The conventional bi-parametric method therefore fails to identify the energies.

It would be interesting to identify these cases of multiple pulses in order to avoid degrading the spectra.

Moreover, the possibility of separating the contributions of the 2 electron clouds is interesting for recognising simple interactions from multiple interactions and to more easily identify the peaks on a Compton continuum.

Indeed, in the energy range 100 keV -1000 keV, the 2 types of important interactions are the photoelectric effect (the photon is completely absorbed) and the Compton Effect (diffusion with deposition of a fraction of energy).

The simple interactions make it possible to obtain a better energy resolution whereas the double interactions have high probabilities of corresponding to reabsorbed Compton photons and therefore belonging to a complete deposition peak.

The combination of these two items of information offers the possibility of reducing the Compton continuum while at the same time improving resolution.

Finally, a third limitation is as follows. Not all detectors provide a current having a "flat" shape. For the geometries commonly used, the current increases when the electrons approach the anode. It is therefore necessary to apply an end of pulse threshold higher than the start of pulse threshold in order to optimise the performance. The measurement is therefore not facilitated.

SUMMARY OF THE INVENTION

The invention first concerns a method for exploiting or analyzing or processing a signal, particularly a current, provided by a detector, in which:

a—one determines a time or a duration spent by at least one part of said signal above a value S0 of a first threshold, b—one determines a charge corresponding to the part of the signal during this time, c—one determines a new value S'0 of the first threshold as a function of the charge and the time thus determined, d—one reiterates at least once the steps a and b by means of the new value of the first threshold.

According to a specific embodiment, a method according to the invention further comprises the following steps:

a1—one determines the time spent by a second part of the signal above a value S1 of a second threshold, b1—one determines the charge corresponding to the part of the signal during this time, c1—one determines a new value S'1 of the second threshold as a function of the charge and time thus determined, d1—one reiterates at least once the steps a1 and b1 by means of the new value of the second threshold.

The invention further concerns a method for exploiting or analyzing or processing a signal, particularly a current, provided by a detector, in which:

a—one defines a first start of signal threshold and a second end of signal threshold, b—one determines the time interval between the instant at which the start of the signal attains the first threshold and the instant at which the end of the signal attains the second threshold, c—one determines the charge corresponding to the part of the signal during this time interval, d—one determines new values of the first threshold and of the second threshold, as a function of the charge and interval thus determined, e—one reiterates the steps b and c with these new values.

The invention further concerns a method for exploiting or analyzing or processing a signal, particularly a current, provided by a detector, comprising a first component superimposed on a second component, in which:

a—one defines a first start of signal threshold, a second end threshold of the first component, and a third end threshold of the second component, b—one determines the time interval between the instant at which the start of the signal attains the first threshold and the instant at which the end of the first component of the signal attains the second threshold, and the time interval between the instant at which the start of the signal attains the first threshold and the instant at which the end of the second component of the signal attains the third threshold, c—one determines a first and a second charge each corresponding to the signal during the corresponding time interval, d—one determines new values of the first threshold, of the second threshold and of the third threshold, as a function of the charge and time interval values thus determined, e—one reiterates the steps b and c with these new values.

Whatever the envisaged embodiment, a method according to the invention involves a re-adaptation, by means of the previous estimation of the charge and the transit time, of the threshold value used for measuring the time and the amplitude.

The invention therefore further concerns a spectrometry method with adaptive bi-parametric correction, preferably by means of digital means.

The new threshold values may be calculated from previously memorised reference data.

Reiteration may take place until at least one difference between two successive values of at least one of the charges determined and/or of the time spent above at least one of the thresholds and/or one of the time intervals is less than a predetermined value.

The steps of determining charges may be performed through integration.

The signal is advantageously filtered before integration.

The new threshold values may be determined by an analytical method, or by an experimental calibration or by modelling.

The signal is generated for example by a semi-conductor detector, for example a CdTe or CdZnTe semi-conductor detector.

The invention further concerns a device for exploiting or processing a signal provided by a detector, comprising:

a—means for determining the time spent by at least one part of the signal above a value S0 of a first threshold, b—means for determining the charge corresponding to the part of the signal during this time, c—means for determining a new value S'0 of the first threshold as a function of the charge and the time thus determined, d—means for reiterating at least once the steps a and b by means of the new value of the first threshold.

Such a device may further comprise:

a1—means for determining the time spent by a second part of the signal above a value S1 of a second threshold, b1—means for determining the charge corresponding to the part of the signal during this time, c1—means for determining a new value S'1 of the second threshold as a function of the charge and the time thus determined, d1—means for reiterating at least once the steps a1 and b1 by means of the new second value of the second threshold.

According to another aspect, the invention further concerns a device for exploiting or processing or analyzing a signal provided by a detector, comprising:

a—means for defining a first start of signal threshold and a second end of signal threshold, b—means for determining the time interval between the instant at which the start of the signal attains the first threshold and the instant at which the end of the signal attains the second threshold, c—means for determining the charge corresponding to the part of the signal during this time interval, d—means for determining new values of the first threshold and of the second threshold, as a function of the charge and interval thus determined, e—means for reiterating the steps b and c with these new values.

It further concerns a device for exploiting or processing or analyzing a signal provided by a detector and comprising a first component superimposed on a second component, said device comprising:

a—means for defining a first start of signal threshold, a second end threshold of the first component, and a third end threshold of the second component, b—means for determining the time interval between the instant at which the start of the signal attains the first threshold and the instant at which the end of the first component of the signal attains the second threshold, and the time interval between the instant at which the start of the signal attains the first threshold and the instant at which the end of the second component of the signal attains the third threshold, c—means for determining a first and a second charge each corresponding to the signal during the corresponding time interval, d—means for determining new values of the first threshold, of the second threshold and of the third threshold, as a function of the charge and time interval values thus determined, e—means for reiterating the steps b and c with these new values.

The means for determining the charge(s) may comprise one or several integrators.

Such a device according to one of the above embodiments may further comprise means for filtering the signal or the signals before integration.

Said means for determining new threshold values can be programmed to implement an analytical method, or an experimental calibration or a modelling.

A detection device according to the invention comprises a detector and a device such as described here-above.

DETAILED DESCRIPTION OF EMBODIMENTS OF THE INVENTION

Figure 4:
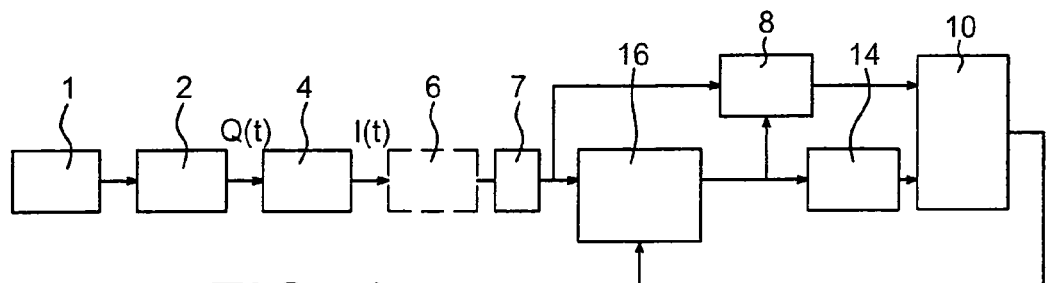
FIG. 4 represents a first example of a device according to the invention.

A first embodiment of the invention is illustrated in FIG. 4.

The system comprises a semi-conductor type detector 1, for example in the field of X or gamma spectrometry.

A charge preamplifier 2 provides an electrical charge Q (t) to a differentiator 4, from which a current pulse I (t) is obtained on the basis of charge Q (t).

Figure 5A:
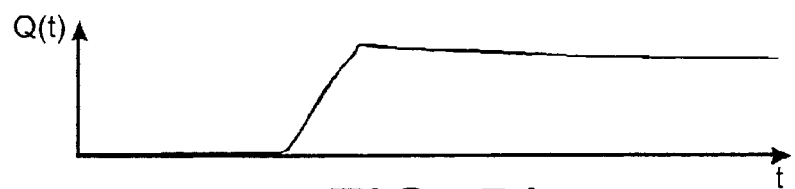
FIGS. 5A-5E represent a series of signals of electrical charge and intensity as a function of time.
Figure 5B:
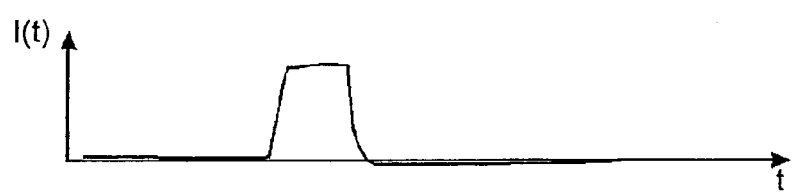

FIGS. 5A and 5B respectively represent time changes of I and Q.

It further comprises comparator type thresholding means 16.

Said thresholding means thus make it possible to identify the instants or the times between which the signal is above a given threshold value. They produce a logic signal, for example a pulse or a gate signal of the type illustrated in FIG. 5D.

Figure 1:
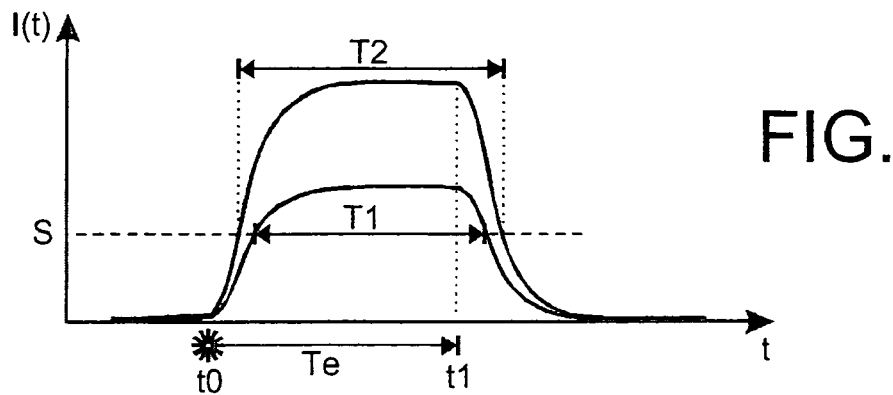
FIGS. 1 and 2 illustrate cases of superimposition of pulses.
Figure 2:
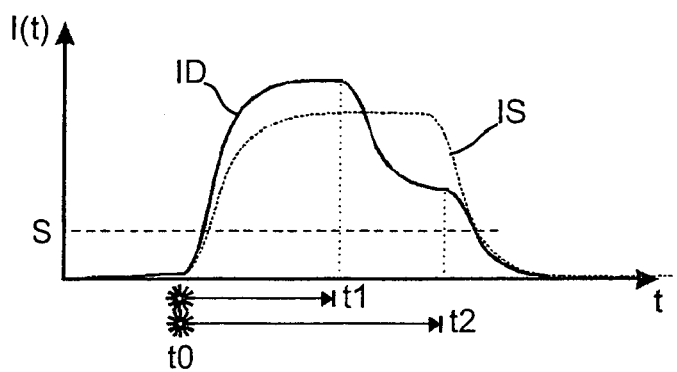
Figure 3:
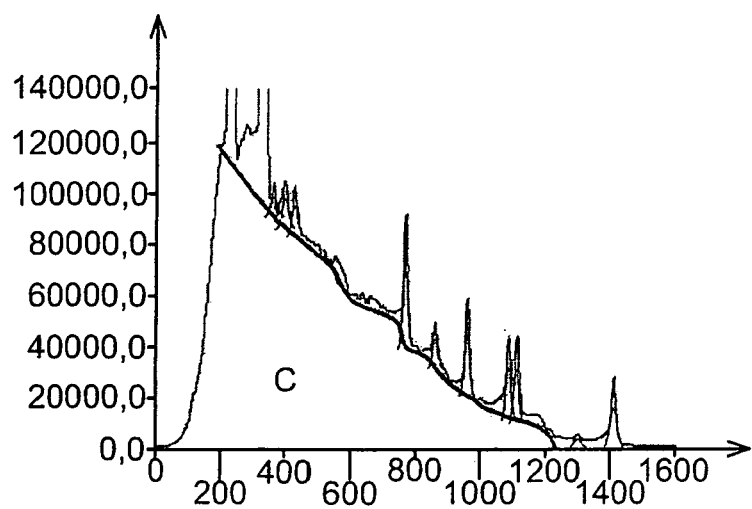
FIG. 3 represents a spectrum obtained, with Compton background.

This device makes it possible to measure the time or the duration the current remains above a certain threshold $S_1$, or is superior to said threshold, which enables a measurement or an estimation of the transit time T (FIG. 1) of the electrons.

Time to amplitude converter means 14 perform this measurement or this estimation of time from the logic signal provided by the thresholding means 16.

An analogue embodiment of means 14 integrate a constant current during the active state of the logic signal.

A digital embodiment of means 14 may for example comprise a clock pulse counter, the frequency of which is compatible with the desired precision.

A commutated integrator 8 integrates the current over this period and thus provides a signal relative to the corresponding electrical charge. This charge is the integral of the signal over the time T.

The informations relating to charge and time (provided by means 8 and 14) are provided to calculation means 10, to calculate or determine a new threshold $S_2$ which will replace threshold $S_1$ in means 16, and which will be better suited to the pulse to be analysed.

Digital threshold calculation means 10 may for example comprise a microprocessor or a programmable arithmetic unit.

One uses, to measure the amplitude, a derivation of the charge signal Q (t), then re-integrated (by the means 8) over the measured time T of the pulse, after thresholding.

The system iterates the process a sufficient number of times to attain a desired precision: at each iteration, one uses a new threshold value. The signal has been previously memorised in the memorisation means 7.

Preferably, the system further comprises a low pass shaping filter 6.

The characteristics of said low pass filter 6 are determined according to the measurement noise spectral density (generated for the most part by detector 1 and pre-amplification electronics 2). Said noise spectral density may either be measured or estimated theoretically.

Figure 5C:
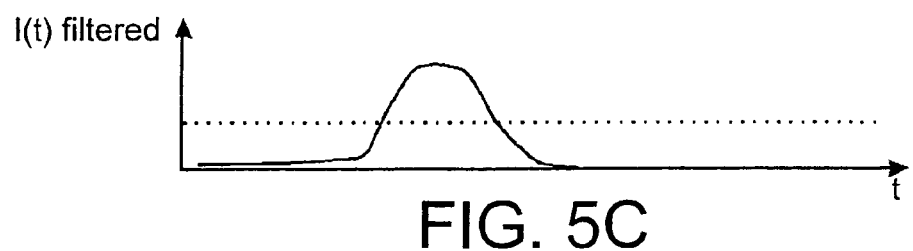
Figure 5D:
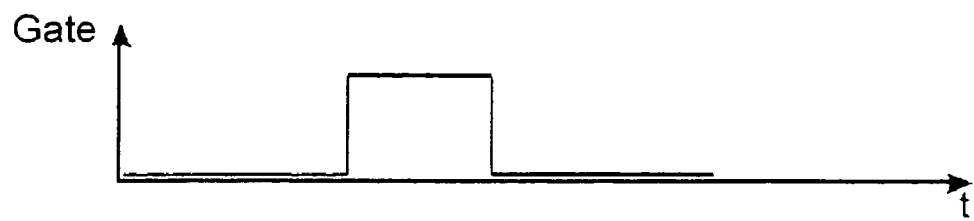
Figure 5E:
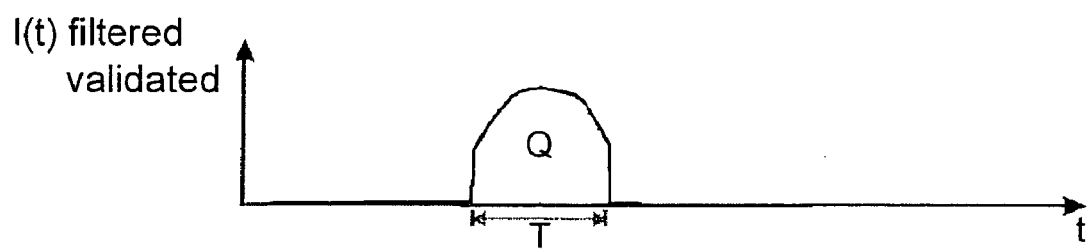

FIG. 5C gives an example of current I(t) after filtering.

The impulse response of this filter 6 is, according to one embodiment, calculated so as to compensate the noise colouration.

A finite impulse response filter 6 of the digital type using, for example, multi-rate techniques may also be suitable and is easier to achieve.

Moreover, in a feedback structure as that of FIG. 4, the output pulse means 6 may be digitized and memorised in memorisation means 7.

One may cite different methods for determining how means 10 can calculate the new threshold.

A first method is known as the analytical method. One estimates the charge Q of the pulse and its time or duration Assuming the current pulse has a square shape, the average current I=Q/T gives a good estimation of the upper level of the pulse. For a filter having a symmetric pulse response, placing the threshold at I/2=Q/2T therefore allows one to lock on the maximum slope. One thus refines the measurement.

A second method is known as the "Experimental calibration method".

By means of a generator, one sends into the input of the system pulses simulating a detector, with a known charge and time or duration (Q,T) pairing. One then scans the domain (Q,T) and, for each adjustment, one determines the threshold value that enables a correct measurement to be obtained (the Q and T values measured using said threshold are in conformance with the real Q and T of the pulse). One is then able to "tabulate" the function threshold=f(Q,T) over the whole domain. A measurement of $Q_m$ and $T_m$ on a real signal, provided by means 8,14, then enables a threshold $S=f(Q_m, T_m)$ to be determined.

A third method is known as the "Modelling Method". This approach is similar but uses a noised pulse model that one derivates and filters (the impulse response of the filter is known).

One then determines, by calculation, the threshold position that enables the best estimation of Q and T, for example by means of the MAP (Maximum A Posteriori) criterion. It involves a probabilistic approach that consists in placing the threshold at a level such that one obtains an estimation of Q and of T with a maximum probability.

Whatever method is used, one can digitize the signal either just before the filtering, or as of the output of the preamplifier 2.

Figure 6:
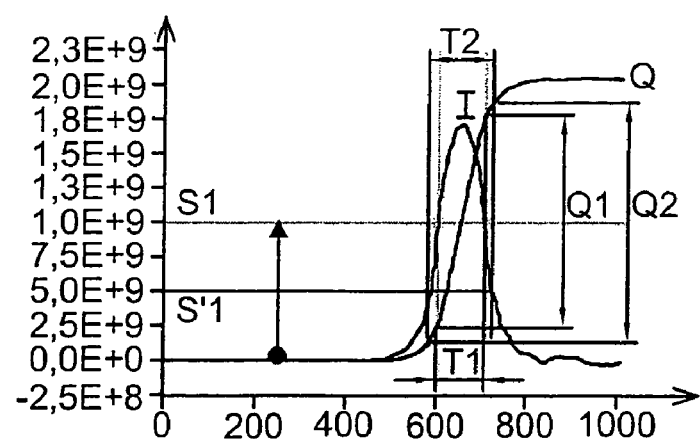
FIG. 6 represents a pulse and the corresponding integrated signal, with the positioning of a threshold, and the measurement of a charge value.

FIG. 6 illustrates the principle of the invention. A first arbitrary threshold $S_1$ makes it possible to define a time interval or a duration $T_1$ during which intensity I is above said threshold $S_1$. A first charge $Q_1$ may then be calculated. On the basis of said first charge and of the value of $T_1$, it is possible to calculate or determine a new threshold $S_2$, from which a new interval or duration $T_2$ is determined, as well as a new charge $Q_2$, etc.

As criterion for convergence, and therefore for stopping the iterations, one may choose a difference, less than a predetermined value, between two successive thresholds $S_i$ and $S_{i+1}$ and/or two successive quantities of charges $Q_i$ and $Q_{i+1}$.

The invention further concerns a device and a spectrometry method with multi-parametric correction for recognising multiple interactions.

Figure 8:
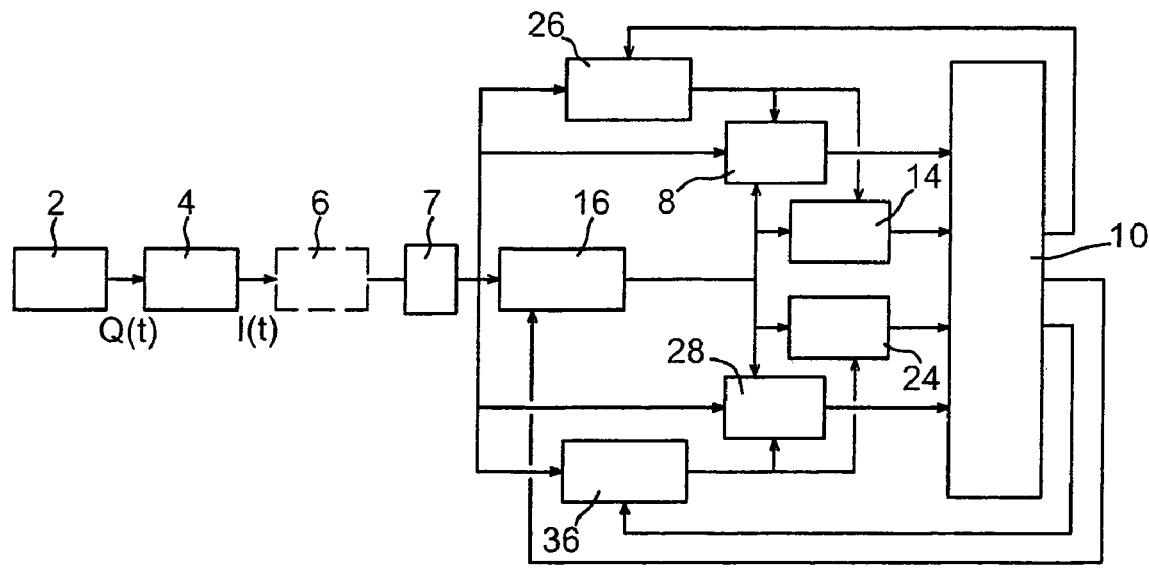
FIGS. 8 and 9 represent other examples of devices according to the invention.

Such a device is illustrated in FIG. 8.

It comprises elements similar to those of FIG. 4, designated by identical numerical references.

But here several thresholdings are applied in order to separate the different components of the pulses.

Figure 7:
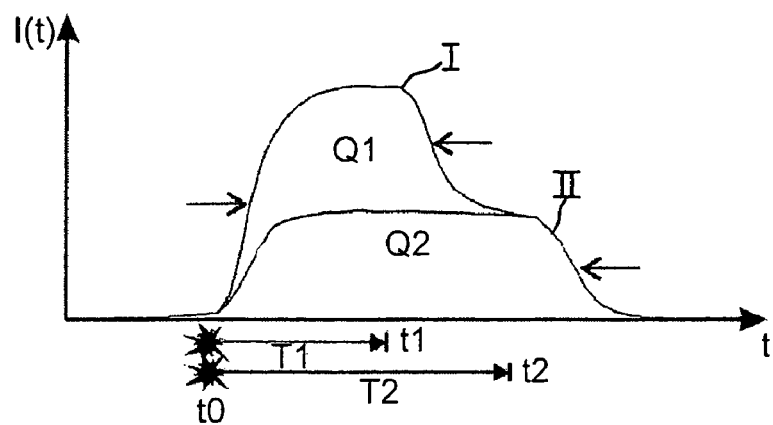
FIG. 7 schematically represents a measurement method according to the invention, in the case of a double pulse.

This system makes it possible, in particular, to process the case of two components (FIG. 7: component I, charge Q1 and time T1 and component II, charge Q2 and time T2).

To break down the pulse, one may for example apply 3 thresholds: a first threshold (S1) to detect the instant of interaction ($t_0$), corresponding to the start or the beginning of the pulse; a second threshold (S2) to detect the end of component n° I ($t_1$) and a third threshold (S3) for the end of component n° II ($t_2$).

The signal is then integrated over two periods (from the start to the end of pulse n° I and from the start to the end of pulse n° II) so as to evaluate the respective contributions of Q1 and Q2.

The integration over T2 therefore gives for example Q1+Q2 whereas the integration over T1 will give Q1+Q2.T1/T2.

By means of these 2 data or equations, one obtains the 2 unknown values Q1 and Q2.

FIG. 8 gives an example of an embodiment of such a device. Apart from the elements already described in relation to FIG. 4, and for this reason designated by identical references, it comprises a second integrator 28, a second time to amplitude converter means 24, as well as a second and a third thresholding means 26, 36 (for example two comparators).

Said three thresholds $S_1$, $S_2$, $S_3$ are respectively associated with thresholding means 16, 26, 36.

The first two thresholds make it possible to determine the start or the beginning and the end of the first component of the signal.

Thresholds $S_1$ and $S_3$ make it possible to determine the start or the beginning and the end of the second component of the signal.

The 3 thresholds S1, S2 and S3 are linked and adjusted by means 10 after calculation of charges Q1 and Q2 and intervals $T_{1\ and\ T2}$ associated with these components.

Here again, means 10 may be programmed according to one of the three above-mentioned methods (analytical method, or by experimental calibration or by modelling).

Figure 9:
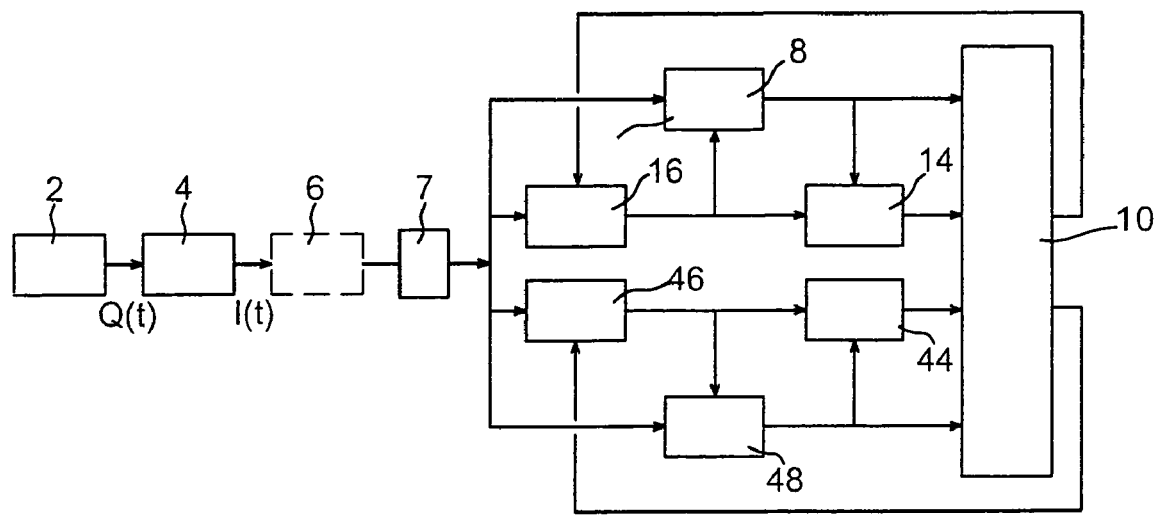

It is also possible to process a signal such as that of FIG. 7 with only two thresholds. In this case, the device is for example that of FIG. 9, with two symmetric connections similar to the processing chain of that of FIG. 4.

In this figure, reference 46 designates thresholding means, reference 48 an integrator, and reference 44 time to amplitude converter means.

First and second thresholds are readjusted by means 10 from the moment data relative to charges and times have been calculated, and these readjusted values are re-injected in the thresholding means 16, 46.

Iterations are repeated until a predetermined convergence threshold is attained. Here again, one can retain, as convergence criterion and therefore for stopping the iterations, a difference, less than a predetermined value, between two successive thresholds $S_i$ and $S_{i+1}$ and/or two successive quantities of charges $Q_i$ and $Q_{i+1}$.

The invention may also be adapted to the different geometries of detectors, particularly detectors of non-planar geometry, giving signals of more complex form.

In this case, the start and the end of the pulse are processed differently, with a start threshold value and an end threshold value that are different to each other.

Preferentially the pulse is first filtered in order to obtain a signal with steeper sides, so as to optimise the precision of the time measurement.

Figure 10:
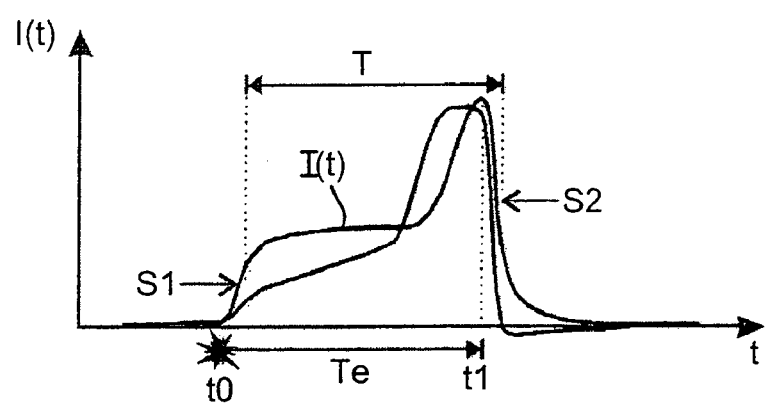
FIG. 10 schematically represents a measurement method according to the invention, in the case of a pulse from a detector with non-planar geometry.

As illustrated in FIG. 10, it is possible with two thresholds $S_1$ and $S_2$ to identify respectively the start or the beginning and the end of a pulse. $t_0$ and $t_1$ respectively represent the instants or times of interaction in the detector and of arrival of the charges at the anode of said detector.

Thresholds $S_1$ and $S_2$ define a time T between start or beginning and end of the pulse.

The charge Q corresponding to the difference between the integrals of the filtered curve (from 0 to T2) and the real curve (from 0 to T1) is calculated (see formula on the following page).

The values of Q and T are entered in calculation means 110 to determine new start and end pulse threshold $S'_1$ and $S'_2$. There ensues a new calculation of charge Q', a new time interval T', which in turn are entered in calculation means 10.

The iterations are repeated until a predetermined convergence threshold is attained.

Figure 11:
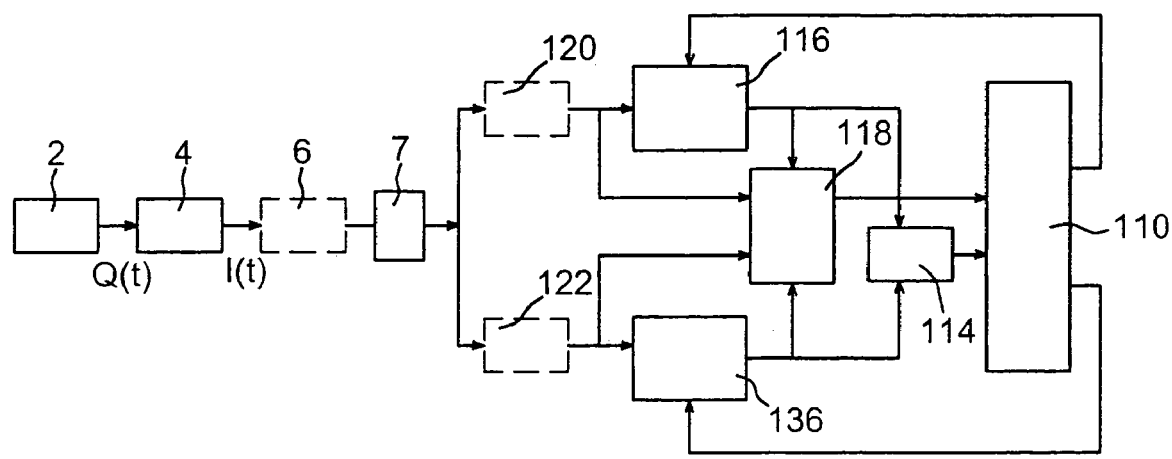
FIG. 11 represents yet another device according to the invention.

A device for the implementation of this method is illustrated in FIG. 11 and comprises two thresholding devices 116, 136 (for example two comparators), a commutated differential integrator 118, a time to amplitude converter 114 and calculation means 110. If necessary, two start and end of signal shaping filters 120, 122 may be arranged in the measuring chain.

In concrete terms, the filtering may be determined in the following manner.

One first establishes a model of the shape of the current detector at the moment of the transition (which may be achieved either in digital form or in analytical form, by a differential equation for example).

One then determines a response of the linear filter transforming this shape into a pulse or a gate signal, which consists in carrying out a mathematical operation of deconvolution.

A commutated differential integrator 118 realises the difference of the integrals of the 2 input signals between the two start and end dates.

Figure 12:
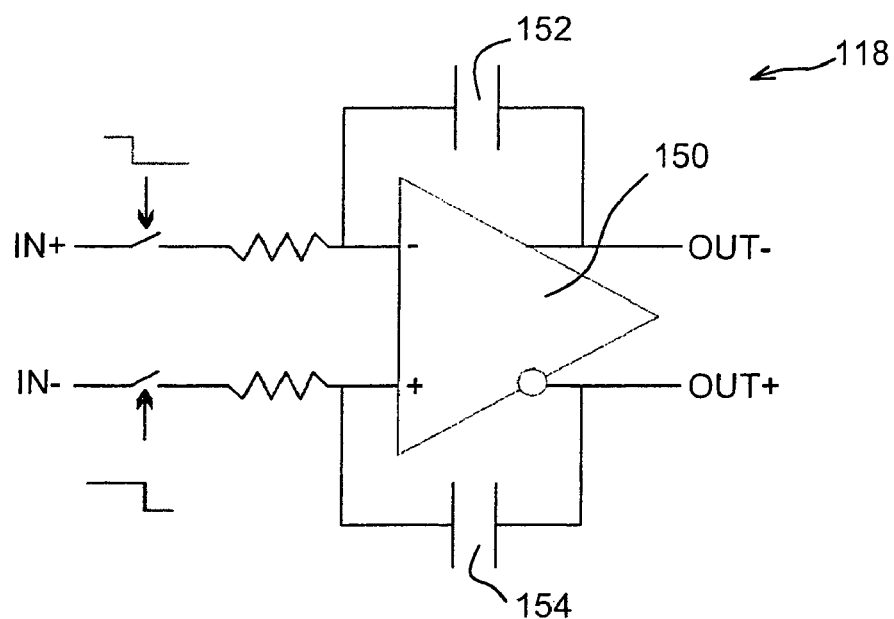
FIG. 12 represents a differential integrator.

This may be carried out analogically in the manner illustrated in FIG. 12 by means of a differential input and output amplifier 150 and two capacitances 152, 154 arranged as indicated in the figure.

The calculation made corresponds to the formula:

$$Q = \int_0^{tstart} IN_+(t)\,dt - \int_0^{tend} IN_-(t)\,dt$$

Whatever the envisaged embodiment, the invention results in the determination of a pairing (charge Q, time T) that makes it possible to determine the energy of the incident photon thanks to a calibration curve established by means of an energy calibrated source. The resulting value of Q is in principle proportional to the energy for a given time T.

A method involving the determination of the energy of the photons as a function of the measured charge and rise time is described in FR-2 738 919.

Calculation means 10, 110 may memorise a correspondence table that makes it possible, during subsequent measurements, to know the threshold to apply to return, by iteration, to the charge representative of the interaction phenomenon.

For a charge Q measured and a time T obtained, for example by comparison of the signal with a threshold S, one searches in the table or in means 10, 110 the pairing (Q, T) and one obtains the corresponding threshold S', itself re-injected as threshold value in the comparator etc.

The invention claimed is:

1. Method for processing a signal resulting from the interaction of an incident photon in a semi-conductor detector, comprising the steps of:
    a—collecting an incident photon in a semiconductor detector,
    b—determining a time spent by at least one part of the signal above a value S0 of a first threshold,
    c—determining a charge corresponding to said at least one part of the signal during said time,
    d—determining a new value S'0 of said first threshold as a function of said charge and said time thus determined,
    e—reiterating at least once steps a and b by means of said new value of said first threshold
    f—stopping said iterations and determining an energy value of said incident photon.

2. Method according to claim 1, further comprising:
    a1—determining a time spent by a second part of said signal above a value S1 of a second threshold,
    b1—determining a charge corresponding to said second part of said signal during said time,
    c1—determining a new value S'1 of said second threshold as a function of said charge and said time thus determined,
    d1—reiterating at least once steps a1 and b1 by means of said new value of said second threshold.

3. Method according to claim 1, said new threshold values being calculated from previously memorised reference data.

4. Method according to claim 1, said step d), or said reiteration, taking place a predetermined number of times.

5. Method according to claim 1, said step d), or said reiteration, taking place until at least one difference between two successive values of at least one of said charges determined and/or of said time spent above at least one of said thresholds and/or one of said time intervals is less than a predetermined value.

6. Method according to claim 1, said charge determining steps being carried out through integration.

7. Method according to claim 6, said signal being filtered before integration.

8. Method according to claim 1, said new threshold values being determined by analytical method, or by experimental calibration or by modelling.

9. Method according to claim 1, said signal coming from a semi-conductor detector.

10. Method according to claim 1, said signal coming from a CdTe or CdZnTe semi-conductor detector.

11. Method according to claim 1, said signal coming from an interaction of an X or gamma radiation with said detector.

12. Method for processing a signal resulting from the interaction of an incident photon in a semi-conductor detector, comprising the steps of:
    a—collecting an incident photon in a semiconductor detector,
    b—defining a first start of signal threshold and a second end of signal threshold,
    c—determining a time interval between the instant at which said start of said signal attains said first threshold and the instant at which said end of said signal attains said second threshold,
    d—determining a charge corresponding to the part of the signal during this time interval,
    e—determining new values of said first threshold and said second threshold, as a function of said charge and time interval thus determined,
    f—reiterating steps b and c with said new values.
    g—stopping said iterations and determining an energy value of said incident photon.

13. Method according to claim 12, said new threshold values being calculated from previously memorised reference data.

14. Method according to claim 12, step e), or said reiteration, taking place a predetermined number of times.

15. Method according to claim 12, step e), or said reiteration, taking place until at least one difference between two successive values of at least one of said determined charges and/or of the time spent above at least one of said thresholds and/or one of said time intervals is less than a predetermined value.

16. Method according to claim 12, said charge determining steps being carried out through integration.

17. Method according to claim 16, said signal being filtered before integration.

18. Method according to claim 12, said new threshold values being determined by analytical method, or by experimental calibration or by modelling.

19. Method according to claim 12, said signal coming from a semi-conductor detector.

20. Method according to claim 12, said signal coming from a CdTe or CdZnTe semi-conductor detector.

21. Method according to claim 12, said signal coming from an interaction of an X or gamma radiation with said detector.

22. Method for processing a signal resulting from the interaction of an incident photon in a semi-conductor detector, said signal comprising a first component superimposed on a second component, said method comprising the steps of:
    a—collecting an incident photon in a semiconductor detector, b—defining a first start of signal threshold, a second end threshold of said first component, and a third end threshold of said second component, c—determining a first time interval between an instant at which the start of the signal attains said first threshold and an instant at which an end of said first component of said signal attains said second threshold, and a second time interval between an instant at which said start of said signal attains said first threshold and an instant at which an end of said second component of said signal attains said third threshold, d—determining a first and a second charge each corresponding to said signal during said first and second corresponding time intervals, e—determining new values of said first threshold, of said second threshold and of said third threshold, as a function of said charge and time interval values thus determined, f—reiterating steps b and c with said new values.

g—stopping said iterations and determining an energy value of said incident photon.

23. Method according to claim 22, said new threshold values being calculated from previously memorised reference data.

24. Method according to claim 22, step e), or said reiteration, taking place a predetermined number of times.

25. Method according to claim 22, step e), or said reiteration, taking place until at least one difference between two successive values of at least one of said charges determined and/or of said time spent above at least one of said thresholds and/or one of said time intervals is less than a predetermined value.

26. Method according to claim 22, said charge determining steps being carried out through integration.

27. Method according to claim 26, said signal being filtered before integration.

28. Method according to claim 22, said new threshold values being determined by analytical method, or by experimental calibration or by modelling.

29. Method according to claim 22, said signal coming from a semi-conductor detector.

30. Method according to claim 22, said signal coming from a CdTe or CdZnTe semi-conductor detector.

31. Method according to claim 22, said signal coming from an interaction of an X or gamma radiation with said detector.

32. Detection device comprising a semi-conductor detector and a device for processing a signal provided by a semiconductor detector, said signal resulting from the interaction of an incident photon in said semi-conductor detector, comprising:

a—time determining means determining a time spent by at least one part of said signal above a value S0 of a first threshold, b—charge determining means determining a charge corresponding to said at least one part of said signal during said time, c—threshold determining means determining a new value S'0 of said first threshold as a function of said charge and said time thus determined, d—means reiterating at least once steps a and b by means of said new value of said first threshold.

33. Device according to claim 32, further comprising:

a1—time determining means determining a time spent by a second part of said signal above a value S1 of a second threshold, b1—charge determining means determining a charge corresponding to said second part of said signal during said time, c1—determining means determining a new value S'1 of said second threshold as a function of said charge and of said time thus determined, d1—means reiterating at least once steps a1 and b1 by means of said new second value of said second threshold.

34. Device according to claim 32, said charge determining means comprising one or more integrators.

35. Device according to claim 32, further comprising filtering means filtering said signal or said signals before integration.

36. Device according to claim 35, said determining means determining said new threshold values implementing an analytical method, or by experimental calibration or by modelling.

37. Detection device comprising a semi-conductor detector and a device for processing a signal provided by a semiconductor detector, said signal resulting from the interaction of an incident photon in said semi-conductor detector, comprising:

a—means defining a first start of signal threshold and a second end of signal threshold, b—means determining a time interval between an instant at which said start of said signal attains said first threshold and an instant at which said end of said signal attains said second threshold, c—means determining a charge corresponding to said signal during said time interval, d—means determining new values of said first threshold and of said second threshold, as a function of said charge and interval thus determined, e—means reiterating steps b and c with said new values.

38. Device according to claim 37, said charge determining means comprising one or several integrator(s).

39. Device according to claim 38, further comprising means filtering the signal or the signals before integration.

40. Device according to claim 37, said new threshold determining means implementing an analytical method, or by experimental calibration or by modelling.

41. Detection device comprising a semi-conductor detector and a device for processing a signal provided by a semiconductor detector, said signal resulting from the interaction of an incident photon in said semiconductor detector and comprising a first component superimposed on a second component, said device comprising:

a—threshold defining means defining a first start of signal threshold, a second end threshold of said first component, and a third end threshold of said second component, b—time determining means determining a time interval between an instant at which said start of said signal attains said first threshold and an instant at which one end of said first component of said signal attains said second threshold, and a time interval between an instant at which said start of said signal attains said first threshold and an instant at which one end of said second component of said signal attains said third threshold, c—means determining a first and a second charge each corresponding to said signal during the corresponding time interval, d—means determining new values of said first threshold, of said second threshold and of said third threshold, as a function of said charge values and time intervals thus determined, e—means reiterating steps b and c with said new values.

42. Device according to claim 41, said means for determining said charge(s) comprising one or several integrator(s).

43. Device according to claim 42, further comprising means filtering said signal or said signals before integration.

44. Device according to claim 41, said means determining said new threshold values implementing an analytical method, or by experimental calibration or by modelling.

* * * * *